United States Patent [19]

Redpath et al.

[11] Patent Number: 5,752,055
[45] Date of Patent: May 12, 1998

[54] SYSTEMS AND METHOD FOR AUTOMATICALLY LINKING PARTS WITHIN COMPOUND DOCUMENTS

[75] Inventors: Richard J. Redpath, Cary; Rodney A. Smith, Raleigh, both of N.C.

[73] Assignee: International Business Machine Corp., Armonk, N.Y.

[21] Appl. No.: 730,559

[22] Filed: Oct. 15, 1996

Related U.S. Application Data

[63] Continuation of Ser. No. 364,858, Dec. 27, 1994, abandoned.

[51] Int. Cl.$^6$ .................................................. G06F 15/00
[52] U.S. Cl. ........................... 395/777; 395/335; 395/346
[58] Field of Search ................................. 395/761, 774, 395/776, 777, 778, 335, 348, 700, 346

[56] References Cited

U.S. PATENT DOCUMENTS

| | | | |
|---|---|---|---|
| 5,214,755 | 5/1993 | Mason | 395/147 |
| 5,235,701 | 8/1993 | Ohler et al. | 395/600 |
| 5,263,167 | 11/1993 | Conner, Jr. et al. | 364/700 |
| 5,303,379 | 4/1994 | Khoyi et al. | 395/700 |
| 5,339,433 | 8/1994 | Frid-Nielsen | 395/700 |
| 5,375,200 | 12/1994 | Dugan et al. | 395/159 |
| 5,408,599 | 4/1995 | Nomura et al. | 395/147 |
| 5,432,904 | 7/1995 | Wong | 395/161 |

FOREIGN PATENT DOCUMENTS 2-242-293  9/1991  United Kingdom.

OTHER PUBLICATIONS

Microsoft Mail for Windows, *A guide to using MS mail on PTOnet*, May 1993, pp. 1–17.
Screen printouts fromMS Mail (Printouts A–E), May 1993.
*Programmer's Reference Vol. 1: Overview*, Microsoft Windows Software Development Kit, Microsoft Corporation, 1992, pp. 255–269.
Kraig Brockschmidt, *Inside OLE 2: The Fast Track to Building Powerful Object–Oriented Applications*, Microsoft Press, pp. 3–25; 429–563 (1993).
*The Common Object Request Broker: Architecture and Specification*, x/Open Company, Ltd. and Object Management Group, Inc., 1992.
*Inside MacIntosh Interapplication Communication*, Addison–Wesley Publishing Co., 193, P.1–1 –1–22.

Primary Examiner—Joseph H. Feild
Assistant Examiner—Stephen Hong
Attorney, Agent, or Firm—Gregory M. Doudnikoff

[57] ABSTRACT

In a computer environment which provides support for compound documents composed of multiple parts, a technique is provided for linking parts which rely on common data so that updating the common data in one part updates the common data in the linked parts. The parts are preferably object oriented in nature, and the linking is performed automatically.

19 Claims, 10 Drawing Sheets

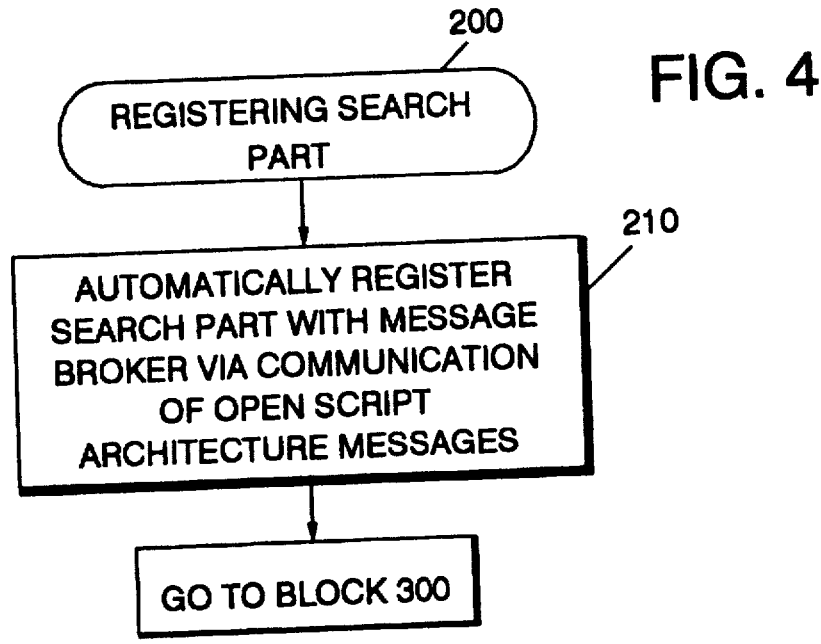
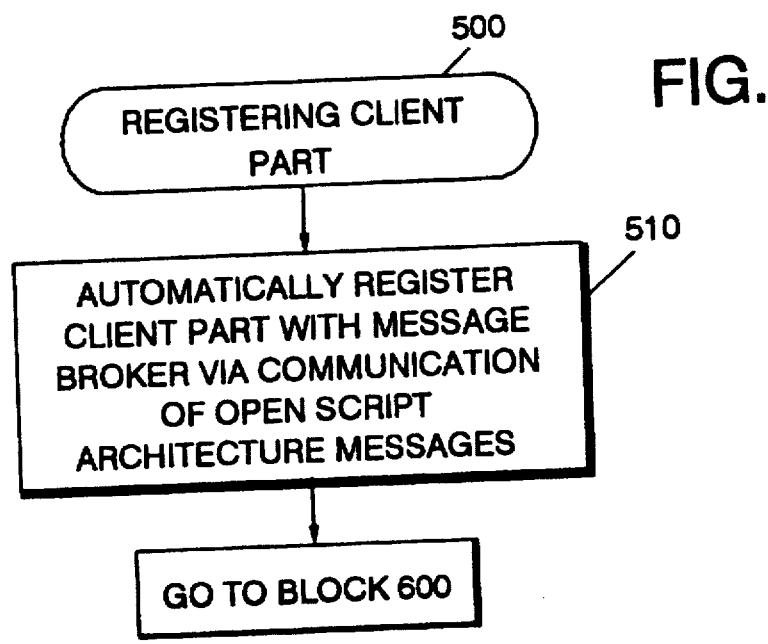

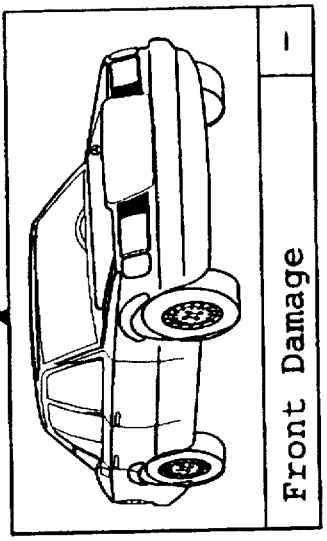

FIG. 10

Global Insurance

Mon 5-23-94 9:30:07
CLIENT PART

Front Damage

Accident occurred in parking lot while car was parked. Police report indicates hit and run with witness of license plate.

Damage estimate Limited to paint and clear coat with no body repair required. License plate of hit and run is XNT567 NC state plate. Car was reported that day stolen and recovered and returned to owner.

Check has been cut and sent to policy owner 3, May 1994 for $567 dollars with a $250 dollar deductible computed.

Front Damage is shown in figure. Additional Closeup figure is also enclosed.

Search Part

Search Part

SYSTEMS AND METHOD FOR AUTOMATICALLY LINKING PARTS WITHIN COMPOUND DOCUMENTS

This is a continuation of application Ser. No. 08/364,858, filed Dec. 27, 1994, now abandoned.

FIELD OF THE INVENTION

This invention relates to data processing systems and methods and more particularly to systems and methods for processing documents on data processing systems.

BACKGROUND OF THE INVENTION

The concept of a document is central to many business operations. A document may be defined as a writing (printed or displayed) which conveys information. Typically, much of the information in a document is conveyed via text. However, it is often desirable to include within a document information conveyed by non-textual formats such as images, photographs, and the like. For example, an automobile insurance claim document might typically include a description of the damage to a vehicle accompanied by a photograph illustrating the damage. The photograph is typically attached to the document by some means such as taping or stapling. In any case, the person creating the document must perform some task to link the photograph and claim document.

Documents are typically created, stored and manipulated in a computing environment using a word processing software application, such as WordPerfect or Microsoft Word. The word processing application interacts with an underlying operating system, such as OS/2, DOS or Windows in personal computing environments. Word processing and operating systems also exist for midrange and mainframe computing environments.

Images, photographs, multimedia and the like are typically created, stored and manipulated in a computing environment using non-word processing software applications. For example, video and audio clips are typically created by multimedia software applications such as Adobe Premiere 4.0 and Macromedia SoundEdit 16. Images are typically created by scanning an existing non-digital image to create a digital version of the image which can then be saved in a variety of digital formats such as TIFF, GIF, and JPEG. Images may be stored as individual data files or as fields within a database. These non-word processing software applications may be executing on the same computing platform as the word processing software application, or on different computing platforms linked via a network.

In a computing environment, it is often desirable to link within a document different types of information generated by separate software applications. Such a document is referred to as a compound document because the results of data processing performed by various external applications are combined into a single container.

To meet the need for compound documents, vendors have designed mechanisms for linking within a text-based document objects containing different data formats such as images, video and audio. For example, Microsoft Object Linking and Embedding (OLE) allows customized links to be created between certain applications and a document using proprietary linking techniques. The linking techniques utilized by OLE are described in chapters 1, 8, and 9 of *Inside OLE 2: The Fast Track to Building Powerful Object-Oriented Applications with Windows Objects*, by Kraig Brockschmidt, published by Microsoft Press, 1993.

Other customized linking systems are described in U.S. Pat. No. 5,235,701 to Ohler et al. entitled "*Method of Generating and Accessing a Database Independent of Its Structure and Syntax*"; U.S. Pat. No. 5,263,167 to Conner, Jr. et al. entitled "*User Interface for a Relational Database Using a Task Object for Defining Search Queries in Response to a Profile Object Which Describes User Proficiency*"; and U.K. Patent Application GB-2 242 293 A to Heninger entitled "*Apparatus and Method for Dynamic Linking of Computer Software Components*".

However, linking objects containing different data formats within a text-based document in a computing environment requires user interaction analogous to the physical attachment of a photograph to a document. For example U.S. Pat. No. 5,303,379 to Khoyi et al., discloses linking objects within documents whereby the user is required to manipulate data between several documents. Each time external data is desired to be included within a document, the user must perform a linking operation. Thus, there is a need to provide a mechanism for automatically linking objects within documents without requiring user interaction.

SUMMARY OF THE INVENTION

It is therefore an object of the invention to provide automatic linking of objects containing different data formats within a document without requiring interaction on the part of the user to perform the linking function.

It is another object of the invention to facilitate the automatic linking of objects containing text and objects containing audio, video, images and the like.

These and other objects are provided, according to the present invention, by a system for automatically linking a plurality of parts within a compound document wherein user activation of a part, containing user input, causes another part to obtain and display data automatically.

In particular, according to the invention, first and second parts are automatically registered with a message broker, and configured within a compound document at corresponding first and second locations. The first part is configured to accept and display user input at the first location. Upon accepting user input, the first part is responsive to user activation, via a keyboard, mouse, or other user input device, by communicating a first message to the message broker. In response to receipt of the first message, the message broker communicates a second message to the second part. In response to receipt of the second message, the second part obtains content data for display or performance within the document at the second location.

According to another aspect of the invention, a compound document is configured to include a client part and first and second user input parts at corresponding spaced apart locations. The first and second user input parts are configured to accept and display user input in text format. In response to user activation of the first user input part, the client part displays or performs a first multimedia work. In response to user activation of the second user input part, the client part displays or performs a second multimedia work.

The invention may be embodied as a search part which is supplied for use in a document handling system in a computing environment including a computing platform which supports compound documents. The search part is configured to incorporate and display user input within a compound document. The search part automatically registers itself with a message broker upon being included within a document, and automatically communicates a message to the message broker upon being activated by a user.

A compound document may be configured to include a document text part and a plurality of parts positioned in a plurality of locations. A selected set of parts, designated as search parts, can be activated by the user to automatically initiate the display or performance of data within another selected set of parts, designated as client parts, at corresponding locations within the document.

For example, in a typical automobile insurance claim report, images of a damaged vehicle may be included with the text of the report to illustrate the extent of damage to the vehicle. A search part may be positioned within the text of the document and configured to accept alphanumeric user input such as Front Damage. A client part may be positioned within the compound document and configured to display the image of the front damage to the vehicle when the corresponding search part is activated.

One advantage of a compound document having a search part and client part is the ability to automatically link different data formats within a document without requiring user interaction. The user is not required to establish the link between parts by dragging or any other operation. Consequently, the ability to quickly and easily create compound documents with a plurality of parts is enhanced. Another advantage is the efficient use of document "real estate" because each search and client part can be sized as small or large as desired by the user. Enhanced compound documents are thereby provided.

BRIEF DESCRIPTION OF THE DRAWINGS

FIGS. 3 through 9 are flow charts illustrating detailed operations for automatically linking parts within a compound document according to the present invention.

FIG. 10 illustrates the automatic linking of a search part and client part according to the present invention in the context of an insurance claim report.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
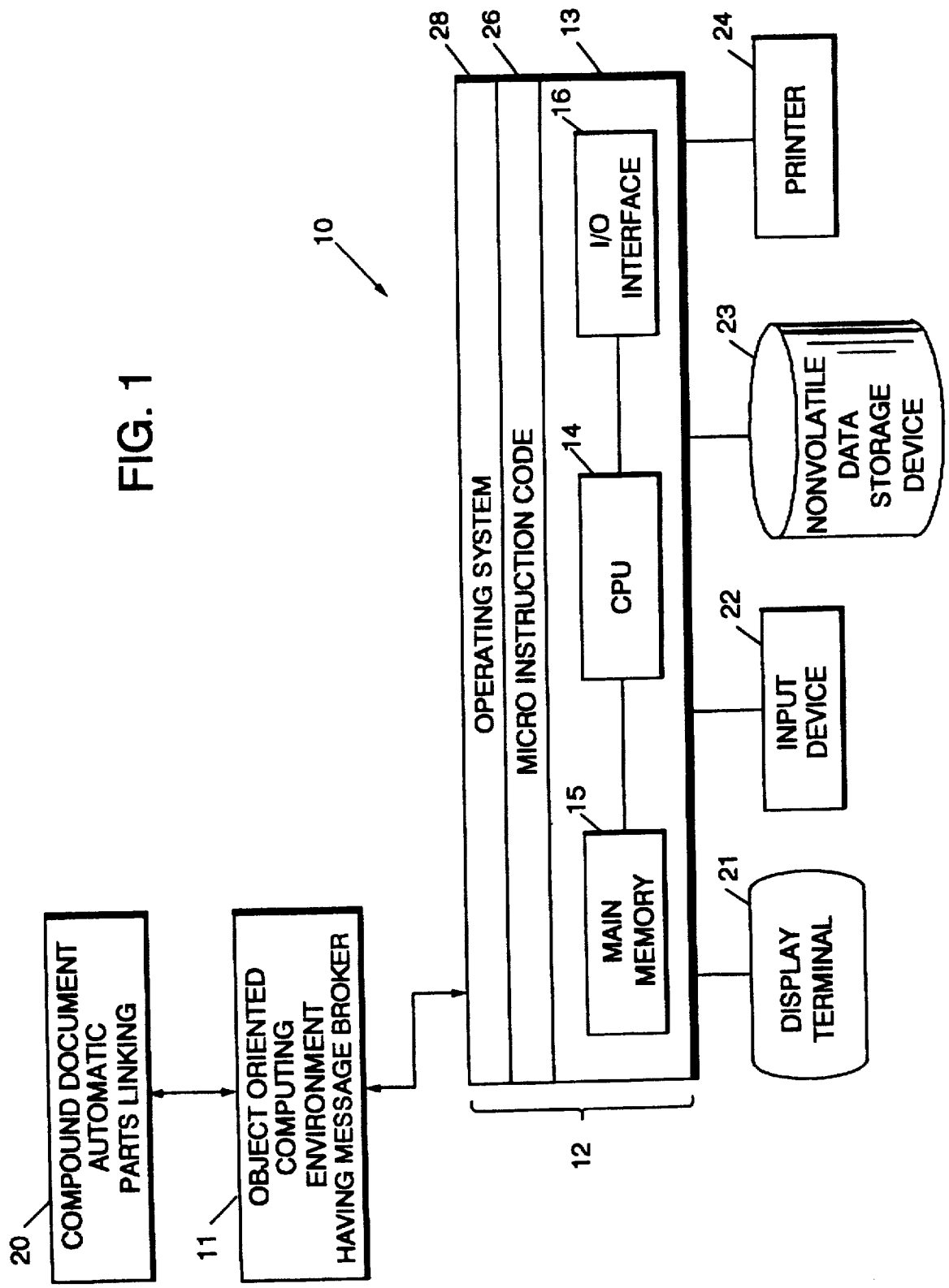
FIG. 1 schematically illustrates a hardware and software environment in which the present invention may operate.

Referring now to FIG. 1, a hardware and software environment in which the present invention may operate will now be described. As shown in FIG. 1, the present invention is a compound document automatic parts linking method and system 20 in a computing environment 10 which operates on one or more computing platforms 12. It will be understood by those having skill in the art that a computing platform 12 typically includes computer hardware units 13, such as a central processing unit (CPU) 14, a main memory 15, and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computing platform 12 also typically includes microinstruction codes 26 and an operating system 28.

Computing platform 12 may be implemented using an Enterprise System Architecture/370 (also called an "ESA/370" an Enterprise System Architecture/390 (also called an "ESA/390" mainframe computer, a midrange computer such as an Application System/ 400 (also called an "AS/400") or a personal computer such as a PS/2or PS/1personal computer, all available from the International Business Machines Corporation (IBM), or other conventional computer platforms. It will also be understood by those having skill in the art that computing platform 12 may operate across multiple computer systems. Operating system 28 may be an IBM Multiple Virtual Storage (MVS) operating system or an appropriate personal computer operating system such as DOS, Windows/NT, UNIX or OS/2, or any other conventional operating system.

As is well known to those skilled in the art, an invention of this type is embodied in computer readable code, also known as software, and executed on the hardware. The flowcharts describe the logical steps carried out by software implementing the invention. Software program code is typically stored in the memory of a stand-alone workstation environment. The software program code may be embodied on any of a variety of known media for use with a data processing system, such as a diskette or CD-ROM. The code may be distributed on such media, or may be distributed to users from the memory of one computer system over a network of some type to other computer systems for use by users of such other systems. Such techniques and methods for embodying the software code on media and/or distributing software code are well known, and will not be further discussed herein.

The present invention is preferably implemented in an object oriented computing environment having a message broker 11. As is well known to those having skill in the art, in an object oriented computing environment, work is accomplished by sending action request messages to an object which contains data. The object will perform a requested action on the data according to its predefined methods. Objects may be grouped into object classes which define the types and meanings of the data, and the action requests that the object will honor. The individual objects containing data are called instances of the object class. Object classes can be defined to be subclasses of other classes. Subclasses inherit all the data characteristics and methods of the parent class. They can add additional data and methods and they can override or redefine any data elements or methods of the parent class. Object oriented computing environment 11 may be implemented using object oriented languages such as C++ and Smalltalk. Object oriented computing environment 11 is well known to those having skill in the art and need not be described further herein.

In a preferred embodiment, the message broker is based on the Common Object Request Broker Architecture (CORBA) as described in *The Common Object Request Broker: Architecture and Specification*, jointly published by the X/Open Company, Ltd. and the Object Management Group, Inc., (OMG Document Number 91.12.1, Rev 1.1). As would be readily understood by those skilled in the art, the message broker provides the mechanism by which objects transparently make requests and receive responses and is structured to allow integration of a wide variety of object systems.

Although compound document parts automatic linking methods and systems of the present invention may operate with any conventional document creating system, it is preferably implemented using the OpenDoc architecture for compound document construction. As is well known to those having skill in the art, the OpenDoc architecture was created as a result of a joint collaboration between Apple Computer, IBM and WordPerfect, and delivers a new paradigm for creating documents by enabling multiple applications to work on the same document.

Figure 2:
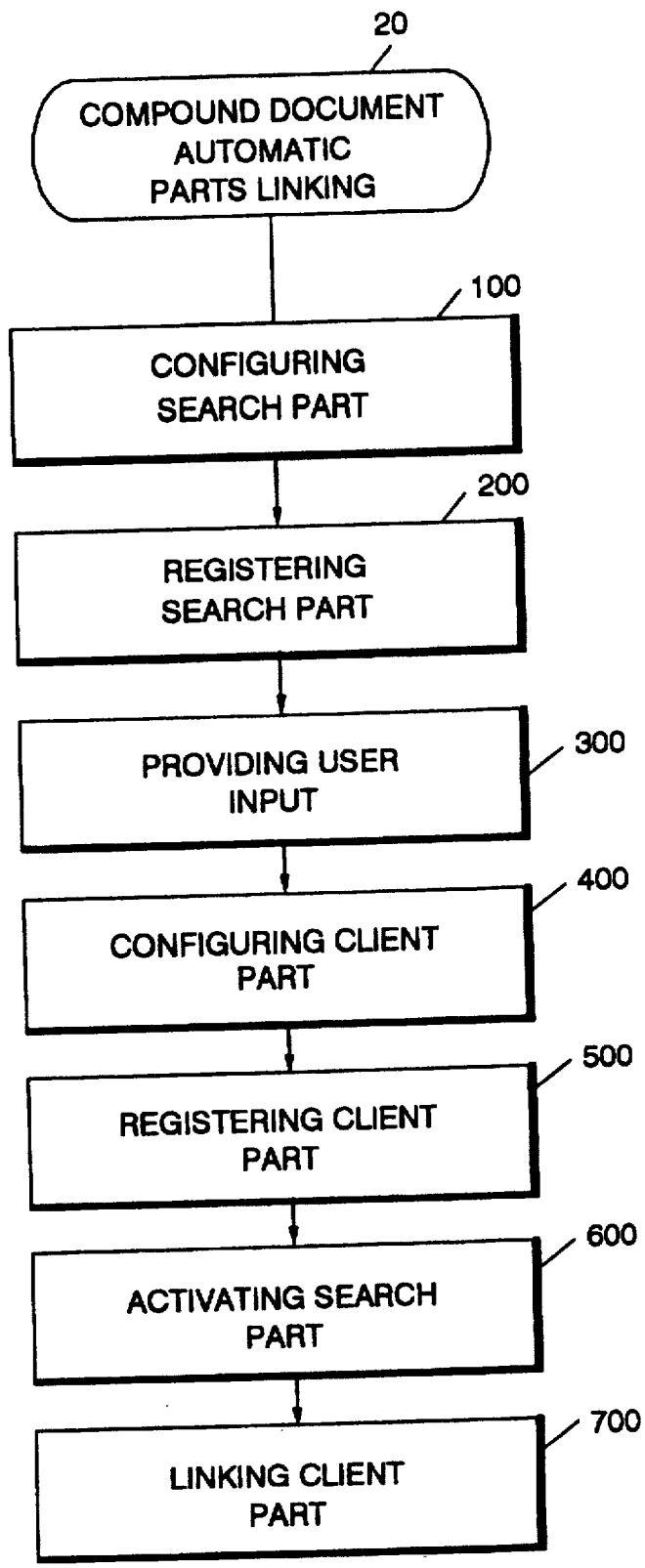
FIG. 2 is a flow chart illustrating operations for automatically linking parts within a compound document according to the present invention.

Referring now to FIG. 2, the compound document automatic parts linking system and method 20 generally includes search part configuring operation 100, search part registering operation 200, user input providing operation 300, client part configuring operation 400, client part registering operation 500, search part activating operation 600, and client part linking operation 700.

In general, search part configuring operation 100 configures a search part, defined below, including search part size and position within a compound document, and allows search part attributes to be set by the user. Search part registering operation 200 automatically registers with the message broker a search part that has been created and placed within a document. User input providing operation 300 accepts user input within a search part and displays the user input at a location within the document.

Client part configuring operation 400 configures a client part, defined below, including client part size and position within a compound document, and allows client part attributes to be set by the user. Client part registering operation 500 automatically registers with a message broker a client part that has been created and placed within a document.

Search part activating operation 600 is achieved by user action on a search part via a user input device such as a keyboard or mouse. In response to user activation, the search part communicates a first message to the message broker. Client part linking operation 700 is initiated by search part activating operation 600. In response to receipt of a first message from the activated search part, the message broker selectively communicates a second message to client parts contained within the compound document. Client parts receiving a message from the message broker utilize the message broker to obtain content data for display or performance.

Accordingly, automatic linking of objects within a compound document is achieved without requiring the user to establish the link. By creating a search part and a client part, providing the search part with input, and activating the search part, a user is able to automatically obtain and display data, such as audio, video, and images elsewhere within a document.

Figure 3:
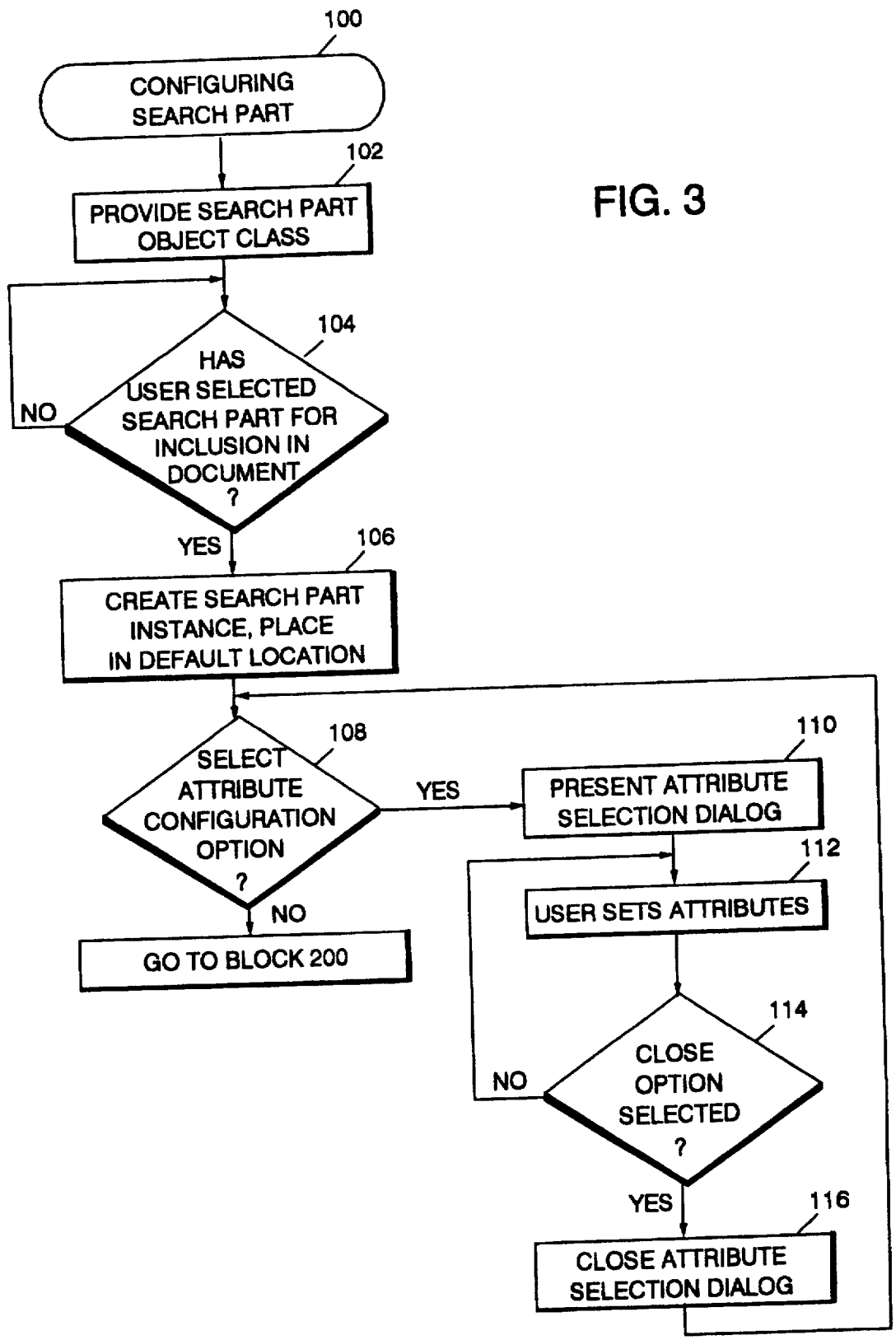

Referring now to FIG. 3, operations for configuring a search part within a compound document (Block 100 of FIG. 2) will now be described. The description assumes that the compound document automatic parts linking system and method 20 (FIG. 1) is implemented in an object-oriented computing environment having a message broker. As such, at Block 102, the search part is provided as an object class within the document processing system. When a particular search part is specified, the user is, in effect defining an instance of the class object which includes the attributes and the incorporated data for use at a specific location within a compound document.

In a preferred embodiment, a search part comprises two components: one that contains the instance data and one that helps the user edit, view and print the search part. The component that contains the instance data is included in the compound document. The component that allows the user to edit, view and print the search part is referred to as the part handler. The part handler is a dynalink library which resides in the compound document creation architecture and which is present on the system of each active user.

Still referring to FIG. 3, at Block 104 a query is made as to whether the user has selected the search part for inclusion in a document. If the user has selected a search part for inclusion in the document, then a search part instance is created and a search part window is placed in a default location within the document, for example in the lower left corner of a document (Block 106).

Figure 11:
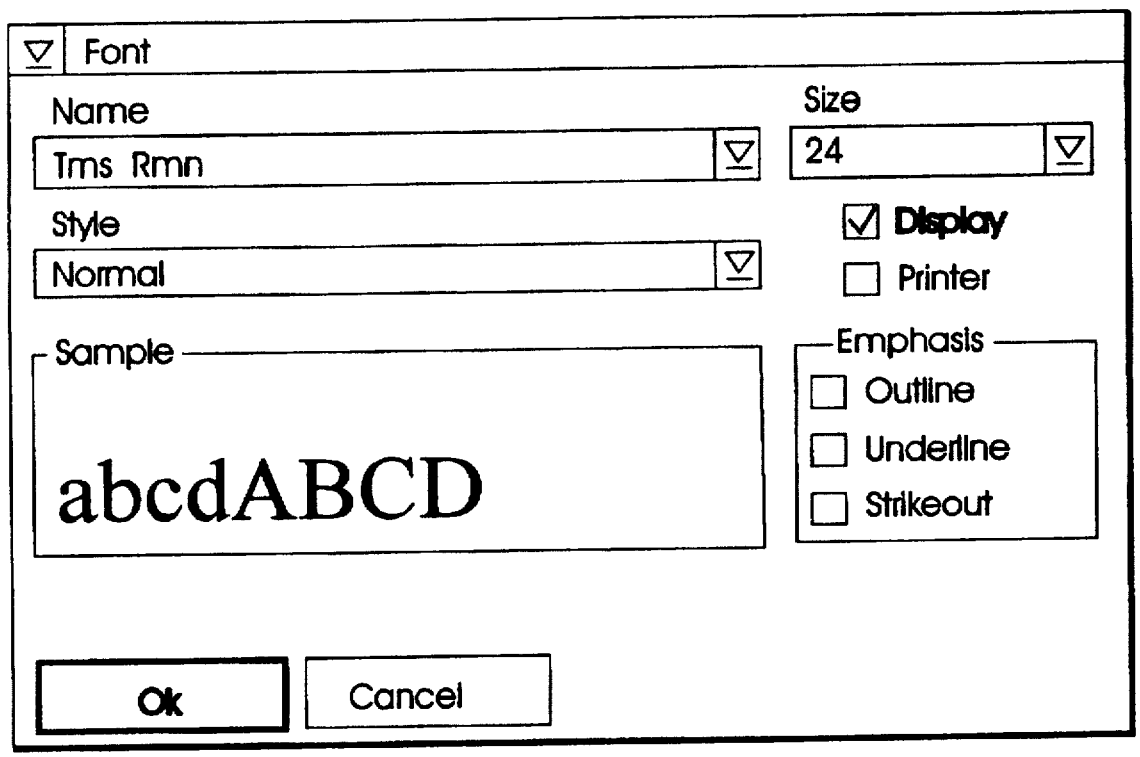
FIG. 11 illustrates a search part attribute selection dialog box for selecting font attributes of the user input.

If the user selects to configure attributes of a search part (Block 108), a dialog box corresponding with the desired attribute is presented (Block 110). For example, FIG. 11 illustrates a dialog box for configuring the font attributes of user input displayed within, and printed from, a search part. As would be readily understood by those having skill in the art, similar dialog boxes may be presented for selecting and modifying various other search part attributes such as color, intensity, and the like (Block 112). As would also be readily understood by those having skill in the art, other means for selecting and configuring search part attributes may include pull-down menus, pop-up menus, and the like.

Upon selection of the close option at Block 114, the attribute selection dialog box is closed at Block 116 and configuration is complete. The attributes are saved in the search part instance and included within the compound document unless the user selects to display an attribute selection dialog box again.

Referring now to FIG. 4, search part registering operation 200 automatically registers a search part with the message broker upon completion of the search part configuration operation 100. Registration is achieved via the communication of Open Script Architecture (OSA) messages to the message broker (Block 210). OSA messages are described in chapter one of a publication by Apple Computer Inc. entitled Inside Macintosh, Interapplication Communication, published by Addison-Wesley Publishing Co., 1993.

Figure 5:
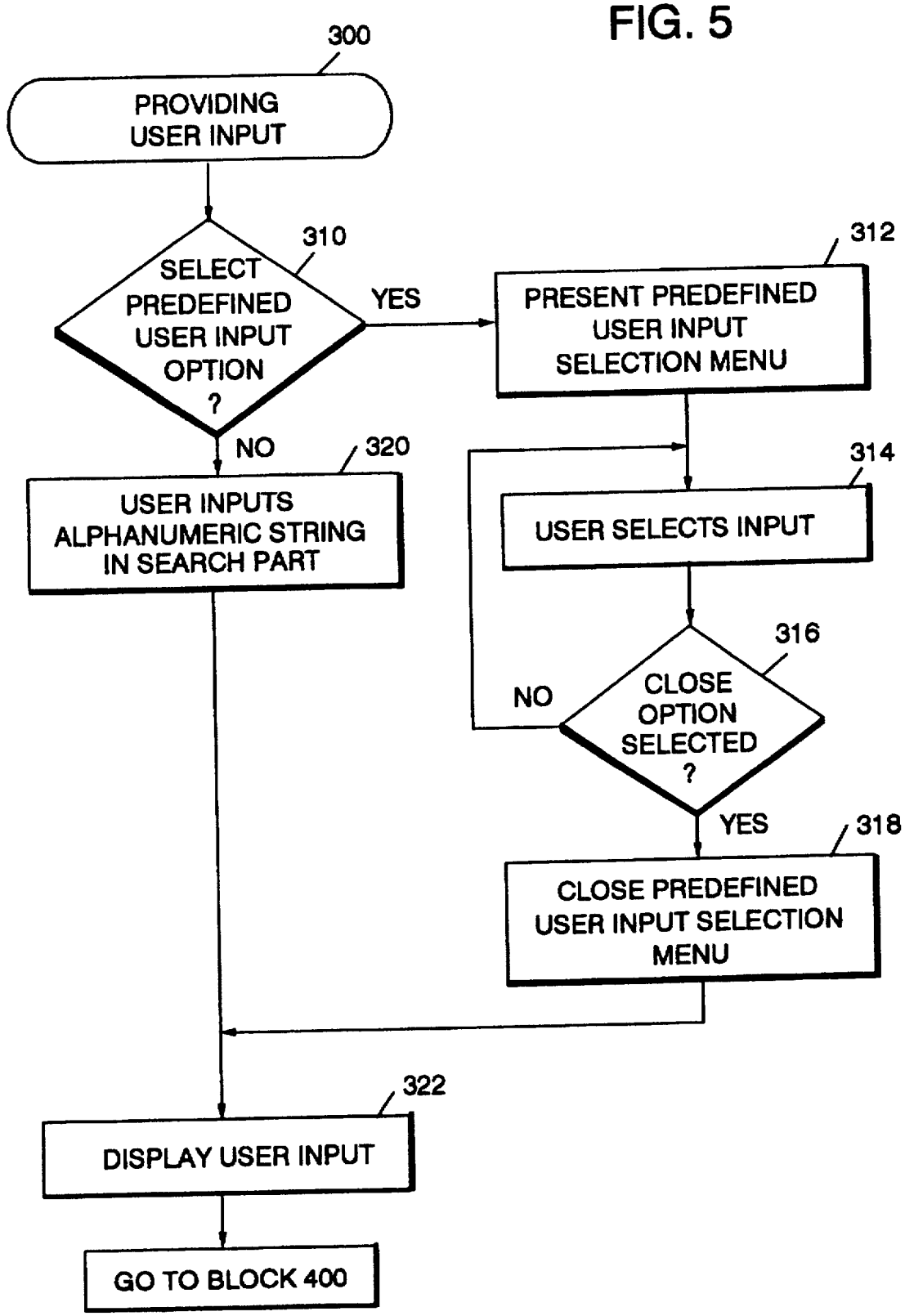

User input providing operation 300 is illustrated in FIG. 5. A configured and registered search part is capable of accepting user input. The user may select to provide input for a search part via a pre-defined input option (Block 310). If the pre-defined option is selected, a selection dialog box or menu is displayed (Block 314). From this dialog box or menu, a user may select predefined input for a search part. By selecting input from the dialog box or menu, input is automatically assigned to a particular search part, without requiring the user to type the input. Upon selection of the close option (Block 316), the predefined input selection dialog box or menu is closed (Block 318).

If the user does not select the predefined dialog box option, input may be entered manually by the user (Block 320). As would be readily understood by those having skill in the art, manually providing input comprises typing and other operations such as cut, copy and paste wherein the user obtains input from sources such as other parts, documents and the like. The user input is displayed within the document at the configured location of the search part (Block 322).

For example, FIG. 10 shows an automobile insurance claim report having first and second search parts containing the input Front Damage and Closeup, respectively. The document illustrated in FIG. 10 also has a client part containing the image of an automobile. User input within a search part may be edited or modified to suit the needs of the user. For example, Front Damage in the search part illustrated in FIG. 10 may be changed to read Side Damage by the user. Activation of a search part within the document illustrated in FIG. 10 will automatically link the activated search part with the illustrated client part, as discussed more fully below.

Figure 6:
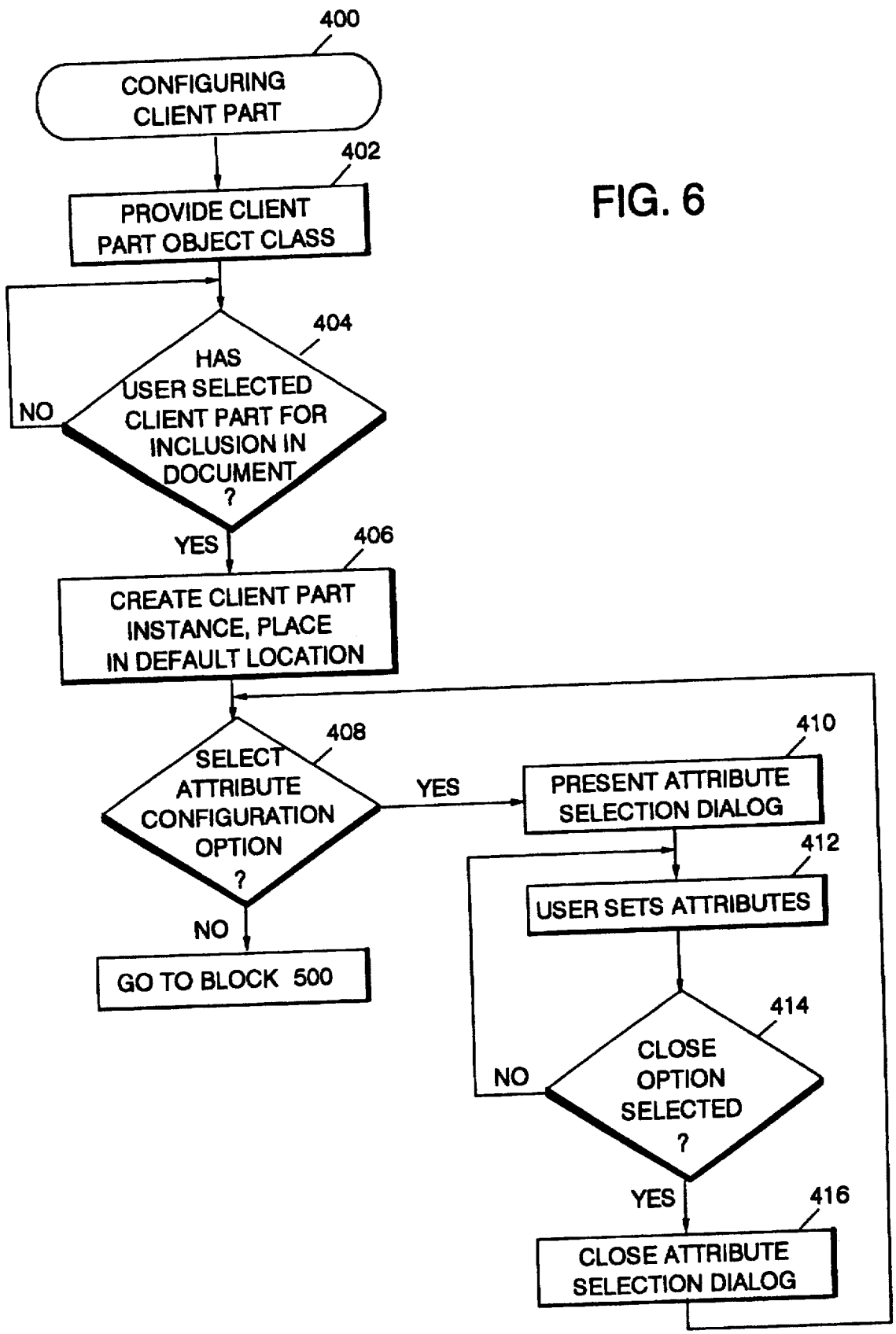

Referring now to FIG. 6, operations for configuring a client part within a compound document (Block 400 of FIG. 2) will now be described. At Block 402, a client part is provided as an object class within the document processing system. When a particular client part is specified, the user is, in effect defining an instance of the class object which includes the attributes and the incorporated data for use at a specific location within a compound document.

In a preferred embodiment, a client part included within a compound document comprises two components: one that contains the instance data and one that helps the user edit, view and print the client part. The component that contains the instance data is included in the compound document. The component that allows the user to edit, view and print the client part is referred to as the part handler. The part handler is a dynalink library which resides in the compound document creation architecture and which is present on the system of each active user. A client part preferably displays and performs multimedia works, including any combination of audio, video, and images.

Still referring to FIG. 6, at Block 404 a query is made as to whether the user has selected the client part for inclusion in a document. If the user has selected a client part for inclusion in the document, then a client part instance is created and a client part window is placed in a default location within a document, for example in the lower right corner of a document (Block 406).

If the user selects to configure the attributes of a client part, a dialog box corresponding with the desired attribute is presented (Block 410) and the user sets and configures the attributes (Block 422). The types of client part attributes may vary according to the intrinsic characteristics of each client part. For example, attributes associated with a client part for performing audio information may include tone, pitch, volume and the like. In contrast, attributes associated with a client part for displaying images may include color, resolution and the like. As would be readily understood by those having skill in the art, other means for selecting and configuring client part attributes may include pull-down menus, pop-up menus, and the like.

Upon selection of the close option at Block 414, the attribute selection dialog box is closed at Block 416 and configuration is complete. The attributes are saved in the client part instance and included within the compound document unless the user selects to display the attribute selection dialog box again.

Referring now to FIG. 7, client part registering operation 500 automatically registers a client part with the message broker upon completion of the client part configuration operation 400. Registration is achieved via the communication of Open Script Architecture (OSA) messages to the message broker (Block 510). Client part registration provides the message broker with which particular search part messages the client part is interested in receiving via activated search parts. Consequently, a link between a client part and a search part is established even before a search part is included within a document. Once a client part is included within a document, a search part may be subsequently added to the document and the message broker will know the relationship, if any, between the search part and client part.

Figure 8:
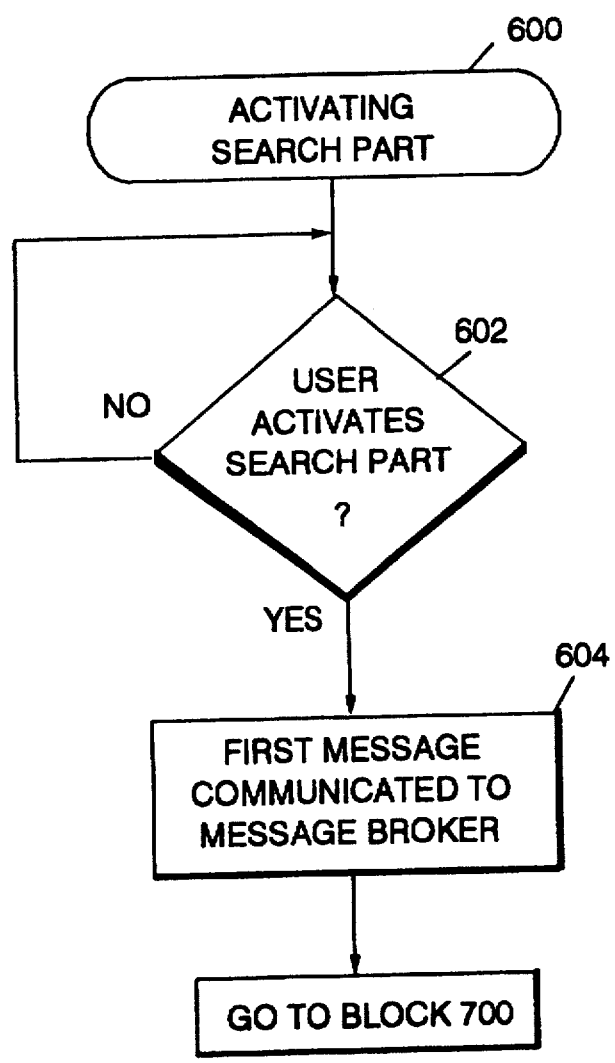

Referring now to FIG. 8, operations for activating a search part within a compound document 600 will now be described. A user may activate a search part containing user input via a keyboard, mouse, or other user input device (Block 602). In response to user activation, the search part communicates a first message to the message broker (Block 604). The first message communicated to the message broker preferably comprises the user input contained within the activated search part and Open Script Architecture (OSA) information about the search part.

Figure 9:
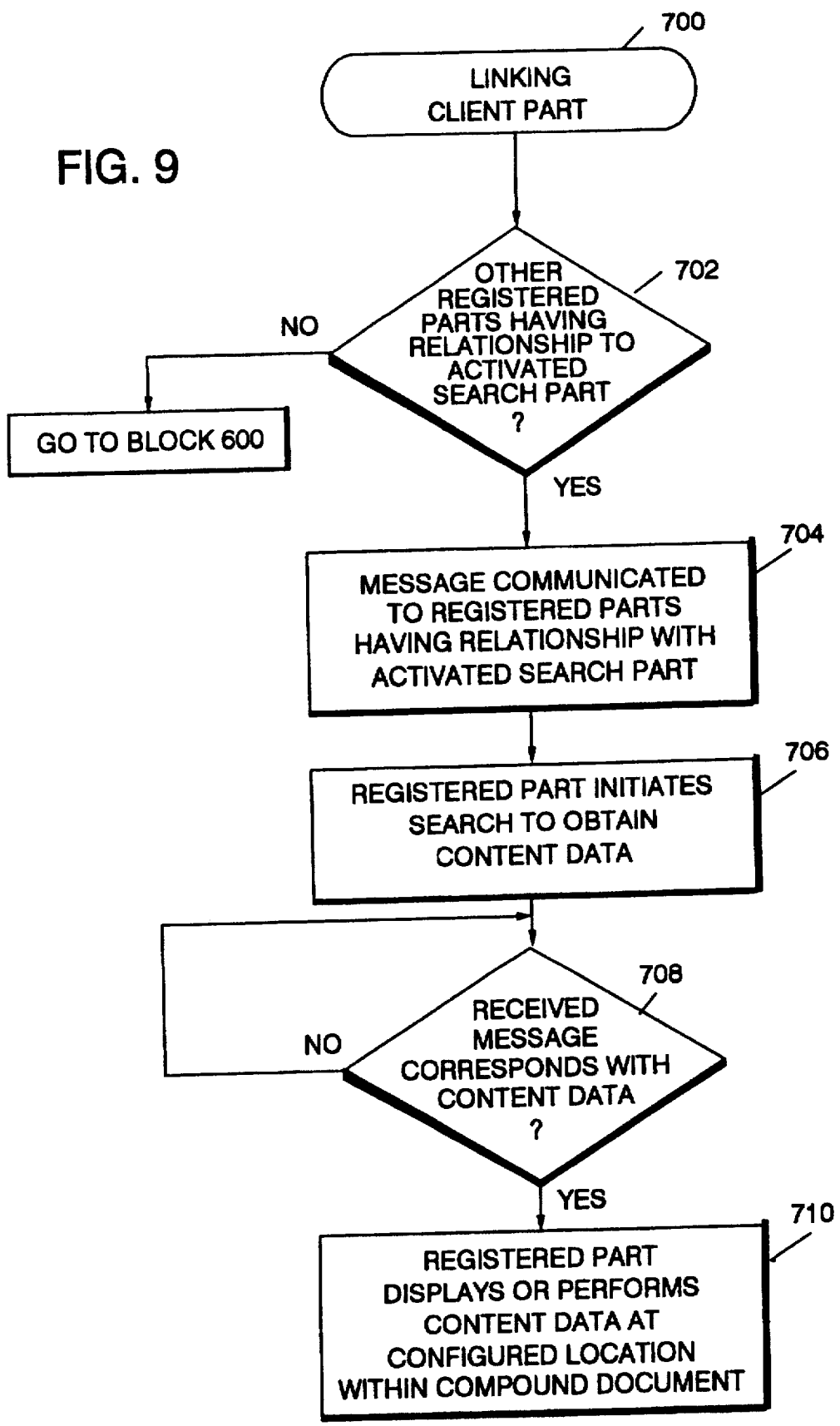

Referring now to FIG. 9, operations for automatically linking a search part and client part within a compound document 700 will now be described. Automatic linking of a search part and client part is initiated by the search part activating operations 600. In response to receipt of a first message from an activated search part, the message broker determines which registered client parts have a relationship with the activated search part (Block 702), and communicates a second message only to those registered client parts having a relationship with the search part (Block 704). Client parts not having a relationship with the activated search part do not receive a message from the message broker in response to the activation of the search part. Consequently, client parts not having a relationship with an activated search part do not perform a function as a result of activation of the search part. The message transmitted from the message broker to the client part preferably is identical to the message transmitted from the activated search part to the message broker.

In response to receiving a second message from the message broker, a client part initiates a search to locate content data that corresponds with the received second message (Block 706). Utilizing the message broker, a query is made whether there is a match between the received second message and the content data contained within a list maintained by the message broker (Block 708). If corresponding data is found, the client part displays or performs the content data at the configured location within the compound document (Block 710). As would be readily understood by those skilled in the art, the message broker is responsible for all the mechanisms required to find any corresponding relationship between client part content data and a message communicated from an activated search part to a client part via the message broker.

The content data displayed or performed within a client part is preferably in multimedia format. Multimedia works may comprise any combination of audio, video, or images. For example, in FIG. 10, if a user activates the search part containing the input Closeup, the client part would display a closeup image of damage to the car. In another embodiment, the client part would display a closeup video of damage to the car.

In yet another embodiment, the client part may perform audio data in response to user activation of a search part. In this embodiment, the client part may have no visible presence within the document to the user. For example, a search part having "Police Officer Report" as the user input might be included within the insurance claim report illustrated in FIG. 10 and, upon activation, a client part would play a recording of the testimony of the police officer at the scene of the car accident.

To summarize the above operations, a search part is configured within a compound document, registered with a message broker, and provided with user input. A client part is configured within a compound document and registered with a message broker. In response to user activation of the search part, a first message is communicated to the message broker. In response to the receipt of the first message, the message broker communicates a second message to the client part if the client part has a relationship with the search part. In response to receipt of the second message from the message broker, the client part obtains and displays or performs content data within the compound document.

Automatic registration of search and client parts with a message broker enables a user to change input within a search part and selectively display data within a client part without requiring the user to perform a linking function between the parts. Registration information provided to the message broker establishes the relationship between a search part and a client part such that the client part obtains and displays data only in accordance with this relationship upon the activation of a search part.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for automatically linking a plurality of parts within a compound document in a computing environment including a computing platform and a message broker executing thereon, said automatic linking system comprising:

means for configuring a compound document including a first part and a second part at corresponding first and second locations, within said compound document;

means, responsive to said configuring means, for automatically registering said first and second parts with said message broker;

means, responsive to user input at said first location, for displaying said user input within said first part at the first location;

means, responsive to user activation of said first part containing said user input, for communicating a first message to said message broker;

means, responsive to receipt of said first message by said message broker for communicating a second message to said second part;

means, responsive to receipt of said second message by said second part for obtaining content data for said second part, based upon the received second message, and for displaying the obtained content data within said second part at said second location.

2. A system according to claim 1 wherein said compound document configuring means comprises means for positioning said first and second parts within said compound document.

3. A system according to claim 2 wherein said compound document configuring means further comprises means for accepting user identification of rendering attributes for said first and second parts.

4. A system according to claim 1 wherein said registering means comprises means for registering Open Scripting Architecture messages from said first and second parts.

5. A system according to claim 1 wherein said first message includes said user input at said first location.

6. A system according to claim 1 wherein said content data obtaining means comprises means for comparing said received second message with a list of content data.

7. A system according to claim 1 wherein said first message is identical to said second message.

8. A system for automatically linking user input and multimedia data within a compound document, in a computing environment including a computing platform, said automatic linking system comprising:

means for configuring a compound document including a client part and first and second user input parts at corresponding spaced apart locations within said compound document;

means for accepting and displaying user input at said first and second user input parts; and means, responsive to user activation of said first user input part, for displaying and performing a first multimedia work in said client part; and means, responsive to user activation of said second user input part, for displaying and performing a second multimedia work in said client part.

9. A system according to claim 8 wherein said compound document configuring means comprises means for positioning said client part and said first and second user input parts within said compound document.

10. A system according to claim 9 wherein said compound document configuring means further comprises means for accepting user identification of rendering attributes for said client part and said first and second user input parts.

11. A system according to claim 8 wherein said computing environment includes a message broker, and said first multimedia work displaying and performing means comprises:

means for automatically registering said client part and said first user input part with said message broker;

means responsive to said user input at said first user input part for sending a first message to said client part via said message broker;

means, responsive to receipt of said first message by said client part, for obtaining said first multimedia work; and means for performing said first multimedia work in said client part.

12. A system according to claim 11 wherein said registering means comprises registering Open Scripting Architecture messages from said client part and said first and second user input parts.

13. A system according to claim 11 wherein said first message sending means comprises means for communicating a first message from said first user input part to said message broker, and means for communicating a second message from said message broker to said client part.

14. A system according to claim 11 wherein said first multimedia work obtaining means comprises means for comparing said received second message with a list of content data.

15. A method for automatically linking a plurality of parts within a compound document in a computing environment including a computing platform and a message broker executing thereon, said automatic linking method comprising the steps of:

configuring a compound document including a first part and a second part at corresponding first and second locations, within said compound document;

automatically registering said first and second parts with a message broker;

accepting and displaying user input within said first part at the first location;

communicating a first message to said message broker in response to user activation of said first part;

communicating a second message from said message broker to said second part in response to receipt of said first message by said message broker;

obtaining content data for said second part in response to receipt by said second part of said second message; and displaying the obtained content data within said second part at said second location.

16. A method according to claim 15 wherein said configuring step comprises the steps of:

positioning said first and second parts within said compound document; and accepting user identification of rendering attributes for said first and second parts.

17. A method according to claim 15 wherein said registering step comprises the step of registering Open Scripting Architecture messages from said first and second parts.

18. A method according to claim 15 wherein said content data obtaining step comprises the step of comparing said received second message with a list of content data.

19. Computer readable code stored on media for providing automatic linkage of parts within a compound document in a computing environment, comprising:

a message broker for registering parts within a compound document and enabling communication between the parts;

first subprocesses for configuring at least a first part and a second part at corresponding first and second locations within the compound document;

second subprocesses for displaying user input at the first location within the first part upon a user inputting data at the first location;

third subprocesses for communicating a first message to said message broker in response to user activation of the first part containing the user input;

fourth subprocess for sending a second message from said message broker to the second part in response to receipt of the first message by said message broker; and fifth subprocesses for obtaining content data for the second part responsive to receipt by the second part of the second message and displaying the obtained content data within the second part at the second location.

* * * * *